(12) United States Patent
Barnes et al.

(10) Patent No.: US 6,202,145 B1
(45) Date of Patent: Mar. 13, 2001

(54) SYSTEM AND METHOD FOR ELIMINATING A RING TRANSITION WHILE EXECUTING IN PROTECTED MODE

(75) Inventors: Stacey Alan Barnes; Craig Bennett, both of Round Rock; Christian Lita, Austin; Martin Daniel Ridgeway, Georgetown, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,370

(22) Filed: Dec. 14, 1998

(51) Int. Cl.[7] .............................. G06F 9/455; G06F 9/46; G06F 9/24
(52) U.S. Cl. ............................... 712/244; 717/11; 717/10; 703/23
(58) Field of Search ................................... 713/156, 167, 713/201; 703/26, 23; 712/234, 218, 229, 23, 740, 42, 244; 717/6, 8, 4, 10, 11

(56) References Cited

U.S. PATENT DOCUMENTS

| | | | |
|---|---|---|---|
| 5,729,728 | * | 3/1998 | Colwell et al. ...................... 712/234 |
| 5,740,248 | * | 4/1998 | Fieres et al. ......................... 713/156 |
| 5,742,794 | * | 4/1998 | Potter ..................................... 703/26 |

* cited by examiner

*Primary Examiner*—Daniel H. Pan
(74) *Attorney, Agent, or Firm*—Leslie A. Van Leeuwen

(57) ABSTRACT

A system, method, and computer readable medium for eliminating unnecessary ring transitions is described. Often, a requested system service or I/O operation can be performed entirely at a higher ring level, such as Ring 3, with no need to transition to a lower ring. In these cases, the software interrupt or I/O instruction which generates the ring transition is replaced by a call to a program executing at the higher ring level. Thus, the software interrupt instruction or I/O instruction is redirected to code that resides at the same protection level and emulates the effects of the instruction, resulting in improved execution speed. In the Intel 80×86 family of microprocessors, both the software interrupt instruction and the I/O instruction take two bytes to encode. It is thus possible to replace the instruction with the op-code for a segment:offset far call, letting the instruction stream dictate the offset for the call. By manipulating the base address of the segment, the target entry point can be controlled, and no ring transitions are needed to process the resulting call. After an instruction has been patched once, it remains patched for each subsequent execution. Thus, each software interrupt instruction and/or I/O instruction need only be patched once.

12 Claims, 4 Drawing Sheets

| | | | | | | | |
|---|---|---|---|---|---|---|---|
| 00401015 | 83 | FB | 01 | | | cmp | ebx,1 |
| 00401018 | 74 | 09 | | | | je | line1(0x00401023) |
| 0040101A | B8 | 0A | 00 | 00 | 00 | mov | eax, 0Ah |
| 0040101F | B7 | 00 | | | | mov | bh, 0 |
| 00401021 | CD | 21 | | | | int | 21h — 200 |
| 00401023 | 3D | FF | FF | 00 | 00 | cmp | eax, 0FFFFh |
| 00401028 | BB | EF | BE | 00 | 00 | mov | ebx, 0BEEFh |
| 0040102D | B9 | CE | FA | 00 | 00 | mov | ecx, 0FACEh |
| 00401032 | 6A | 00 | | | | push | 0 |
| 00401034 | E8 | 57 | 00 | 00 | 00 | call | exit (0x00401090) |
| 00401039 | 83 | C4 | 04 | | | add | esp, 4 |

| | | | | | | | | |
|---|---|---|---|---|---|---|---|---|
| 00401015 | 83 | FB | 01 | | | | cmp | ebx,1 |
| 00401018 | 74 | 09 | | | | | je | line1(0x00401023) |
| 0040101A | B8 | 0A | 00 | 00 | 00 | | mov | eax, 0Ah |
| 0040101F | B7 | 00 | | | | | mov | bh, 0 |
| 00401021 | 9A | 07 | 3D | FF | FF | 00 00 | call | main (0x00401028) +20h |
| 00401028 | BB | EF | BE | 00 | 00 | | mov | ebx, 0BEEFh |
| 0040102D | B9 | CE | FA | 00 | 00 | | mov | ecx, 0FACEh |
| 00401032 | 6A | 00 | | | | | push | 0 |
| 00401034 | E8 | 57 | 00 | 00 | 00 | | call | exit (0x00401090) |
| 00401039 | 83 | C4 | 04 | | | | add | esp, 4 |

SYSTEM AND METHOD FOR ELIMINATING A RING TRANSITION WHILE EXECUTING IN PROTECTED MODE

FIELD OF THE INVENTION

The present invention relates to the field of information handling systems, and, more particularly, to a system and method for instruction patching in protected mode in order to eliminate a ring transition.

BACKGROUND OF THE INVENTION

As microprocessors have evolved over time, different operating modes have been developed. Earlier microprocessors, such as the Intel 8088, Intel 8086, Intel 80188, and Intel 80186, operate only in real mode. In real mode, addresses are generated by shifting the value of a 16-bit segment register by four bits, and then adding a 16-bit address offset. Later microprocessors, beginning with the Intel 80286, add a second operating mode, referred to as protected mode. In protected mode, the segment registers do not contain real (i.e. physical) addresses. Rather, each segment register contains an index into a table of segment descriptors. A segment descriptor contains the start address (i.e. base address) of the segment, along with memory protection information, such as an offset limit, and read and write permission bits. An address is generated by adding an offset to the start address of the segment. Note that a segment start address in the 80286 is a 24-bit base address, while a segment start address in the 80386 is a 32-bit base address. Later microprocessors, such as the 80286 and 80386, operate in real mode when first powered up. Protected mode may be enabled by software. In addition, the 80286, 80386, and later microprocessors are designed to be upwardly compatible with the addressing scheme of earlier microprocessors.

Various features of the 80386 support multitasking. The 80386 includes memory paging hardware, which allows the implementation of a virtual memory system. The 80386's memory management capabilities may be used to isolate tasks from each other, and to prevent one task from corrupting another task's data or code areas. Note that a task is a program or group of programs which uses a particular set of resources (e.g., address space, registers, etc.). The 80386 further includes privilege level protection, which is used to selectively protect various portions of the operating system and other software (e.g., device drivers) from application programs. Privilege level protection may also be used to protect some parts of the operating system from other parts of the operating system, or for protecting a task from some of its own errors.

The privilege level protection of the 80386 is based on a privilege hierarchy. Privilege levels are typically referred to as rings, with Ring 0 being the most privileged level, and Ring 3 being the least privileged level. A program assigned to a particular privilege level can only access data and other programs which are assigned to the same or a higher privilege level. Thus, a Ring 2 program can call other Ring 2 programs and Ring 3 programs, but can not make a direct call to a Ring 1 or Ring 0 program. One typical manner for assigning privilege in a computer system is to assign the operating system kernel to Ring 0, other operating system services to Ring 1, original equipment manufacturers (OEMs) software (e.g., device drivers) to Ring 2, and user applications to Ring 3.

Whenever an application program executes an interrupt or an I/O instruction, the processor generates an exception which forces an execution mode switch. Usually, this is a switch from Ring 3 to Ring 0 in order to allow the system to handle the exception. Note that I/O instructions do not always generate an exception. Exceptions occur if the I/O privilege level of an application does not allow it to access ports normally and/or the I/O permission bit map does not grant access to the port. Also, many newer application programs do not use interrupts to request system services. However, a large number of legacy DOS programs exist and are used extensively in today's information handling systems. The IBM Personal Computer, and other early personal computers (PCs), utilized the Intel 8088 microprocessor. The primary operating system for early PCs was the Disk Operating System (DOS). A large amount of software is still in use that was originally written to operate in a DOS environment on an 8088-based PC.

Due to the large amount of execution state information that must be saved during a ring transition, exception handling for these instructions requires a large number of clock cycles. Consequently, it would be desirable to have a system and method for eliminating unnecessary ring transitions in an information handling system, executing in protected mode. It would also be desirable to handle software interrupts and exceptions as quickly as possible.

SUMMARY OF THE INVENTION

Accordingly, the present invention is directed to a system, method, and computer readable medium for eliminating unnecessary ring transitions. Often, a requested system service or I/O operation can be performed entirely at a higher ring level, such as Ring 3, with no need to transition to a lower ring. In these cases, the software interrupt or I/O instruction which generates the ring transition is replaced by a call to a program executing at the higher ring level. Thus, the software interrupt instruction or I/O instruction is redirected to code that resides at the same protection level and emulates the effects of the instruction, resulting in improved execution speed. In the Intel 80×86 family of microprocessors, both the software interrupt instruction and the I/O instruction take two bytes to encode. It is thus possible to replace the instruction with the op-code for a segment:offset far call, letting the instruction stream dictate the offset for the call. By manipulating the base address of the segment, the target entry point can be controlled, and no ring transitions are needed to process the resulting call.

After an instruction has been patched once, it remains patched for each subsequent execution. Thus, each software interrupt instruction and/or I/O instruction need only be patched once.

An advantage of the present invention is that unnecessary ring transitions are eliminated in programs executing in protected mode. A further advantage of the present invention is that software interrupts and exceptions are handled quickly and efficiently.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIGS. 2A and 2B illustrate instruction patching according to the teachings of the present invention;

DETAILED DESCRIPTION OF A PREFERRED EMBODIMENT OF THE INVENTION

Figure 1:
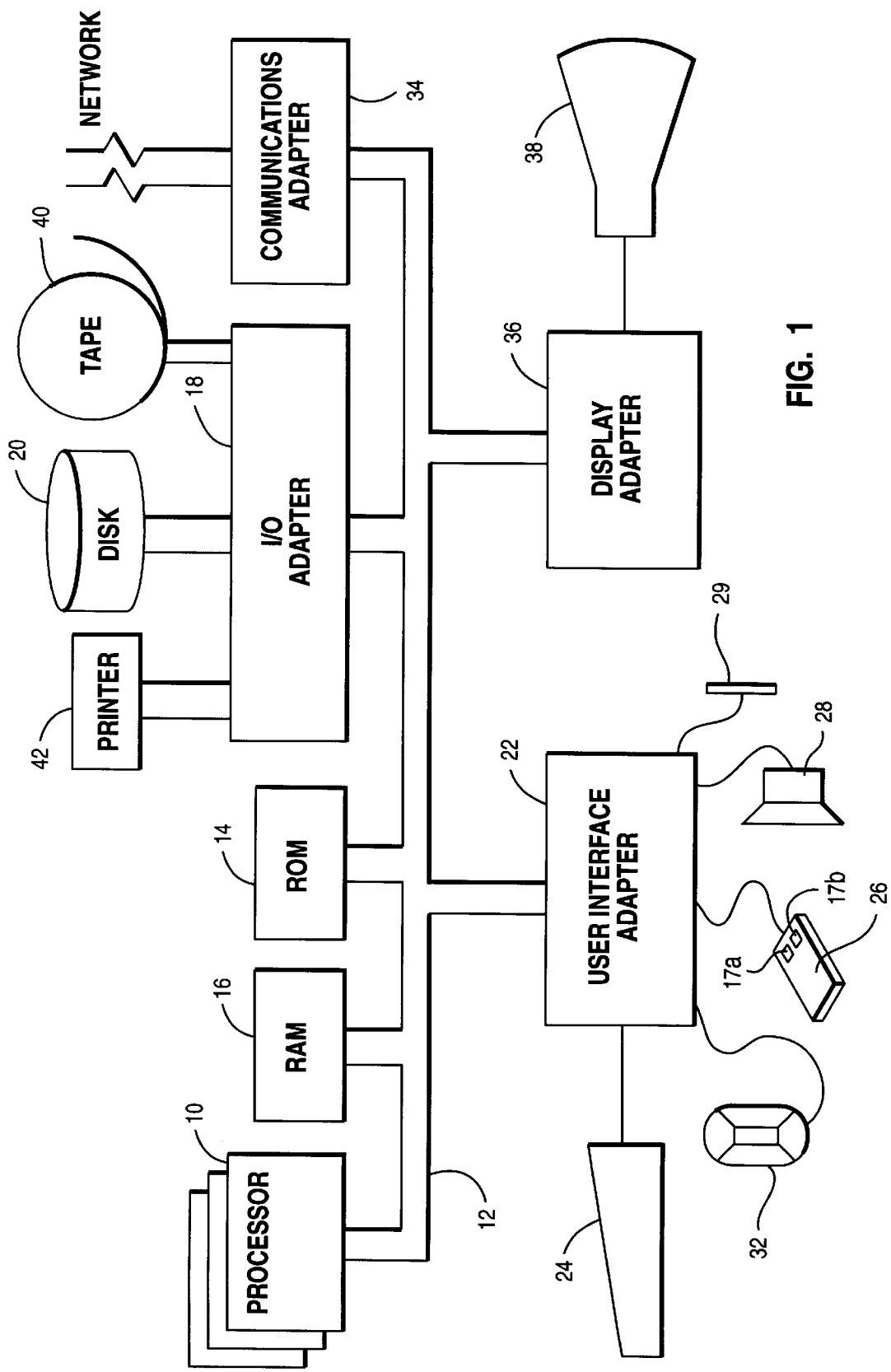
FIG. 1 is a block diagram of an information handling system on which the present invention may be implemented.

The invention may be implemented on a variety of hardware platforms, including personal computers, workstations, minicomputers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29, to bus 12, communications adapter 34 for connecting the information handling system to a data processing network, and display adapter 36 for connecting bus 12 to display device 38.

Communications adapter 34 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

The present invention is a system, method, and computer readable medium for eliminating unnecessary ring transitions. Often, a requested system service or I/O operation can be performed entirely at a higher ring level, such as Ring 3, with no need to transition to a lower ring. In these cases, the software interrupt or I/O instruction which generates the ring transition is replaced by a call to a Ring 3 program. Thus, the software interrupt instruction or I/O instruction is redirected to code that resides at the same protection level and emulates the effects of the instruction, resulting in improved execution speed. In the Intel 80×86 family of microprocessors, both the software interrupt instruction and the I/O instruction take two bytes to encode. It is thus possible to replace the instruction with the op-code for a segment:offset far call, letting the instruction stream dictate the offset for the call. By manipulating the base address of the segment, the target entry point can be controlled, and no ring transitions are needed to process the resulting call.

FIGS. 2A and 2B depict the instruction patching of the present invention. For illustrative purposes, the assembly code shown is 80386 assembly code. Those skilled in the art will appreciate that the present invention may be applied to many types of code, and is not limited to software executing on an 80386 microprocessor.

Referring now to FIG. 2A, a code segment, including a software interrupt instruction, int 21h (reference numeral 200), is shown. Because the software interrupt instruction (and also the I/O instruction) requires two bytes to encode (i.e. CD 21), it is possible to change the instruction into a call gate with the same privilege using a selector-offset combination. Thus, the interrupt is replaced with a call to an emulation program. This is shown in FIG. 2B, at reference numeral 202. Note that the software interrupt instruction (i.e. int 21h, encoded as CD 21) has been replaced by a call gate instruction. The first byte, reference numeral 204, contains the op-code for the call gate instruction (i.e. 9A). The next byte, reference numeral 206, contains the low order byte for the selector to be loaded in the code segment (i.e. 07). The next five bytes of the instruction stream, reference numeral 208, dictate the offset relative to the selector segment base. A description of address calculation in the 80×86 microprocessor, including selector and segment information, may be found in the Pentium Family User's Manual, Volume 3, Architecture and Programming (1994, ISBN 1-55512-227-2).

Note that care must be taken in the emulator software to adjust the return address to return back to address 0x00401023, rather than to 0x00401028. The disassembler used to generate the code segment shown in FIG. 2B shows the return address that would be pushed on the stack (i.e. 0x00401028). As discussed below, with reference to FIG. 4, the emulation software adjusts the return address, so that the next instruction executed after the call to the emulation program is the "cmp" instruction at location 0x00401023.

Figure 3:
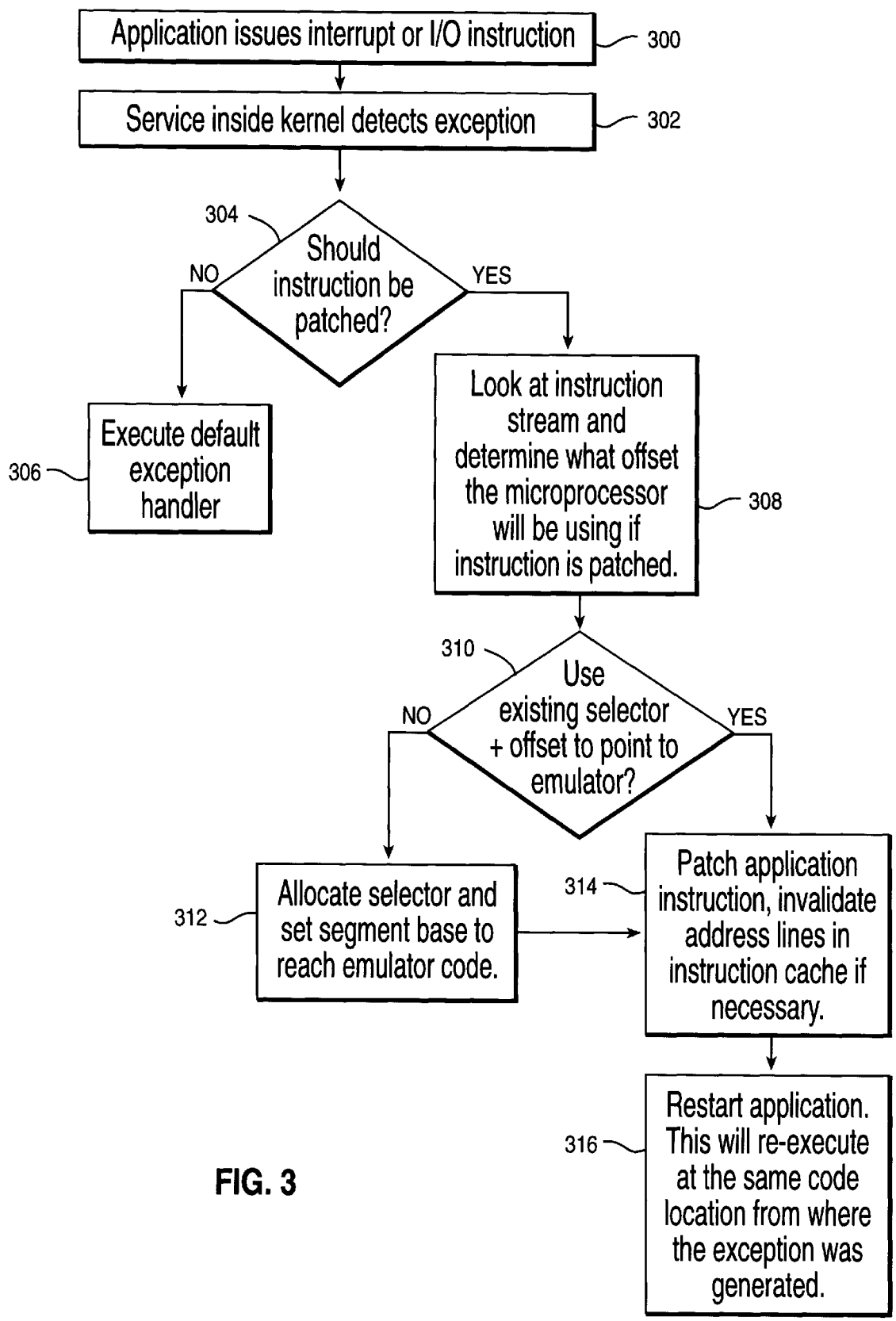
FIG. 3 is a flow chart depicting a method for instruction patching in order to avoid future ring transitions according to the teachings of the present invention.

Referring now to FIG. 3, a method for patching software in order to avoid a ring transition will now be described. An application program issues a software interrupt instruction or an I/O instruction (step 300) which generates an exception. A service program operating within the operating system kernel detects the exception (step 302). The service program determines if the exception has been caused by an instruction which can be patched (step 304). If not, the default exception handler is executed (step 306).

If, however, the instruction can be patched to avoid a ring transition (i.e. the answer to the question in step 304 is "yes"), then the service program analyzes the instruction stream to determine the offset the microprocessor will be using if the instruction is patched (step 308). As discussed above, the offset is the next five bytes after the two-byte call instruction. The service program then determines if it is possible to point to the emulator program using the five-byte offset, as it exists, along with a one-byte selector (step 310). If not, the service program allocates a selector and sets a segment base in order to reach the emulator program (step 312), and then proceeds to step 314. If it is possible to reach the emulator program using the existing offset, along with a selector (i.e. the answer to the question in step 310 is "yes"), the service program proceeds directly to step 314. In step 314, the instruction is patched, as shown in FIGS. 2A and 2B. Note that in the example shown in FIGS. 2A and 2B, it is not possible to reach the emulator program using the existing offset (i.e. 21), and thus, in step 312, a low order byte for a selector (i.e. 07, reference numeral 206) is calculated. The application program is then restarted at the place in the program where the exception was generated (step 316). In the example shown in FIG. 2B, the application program would be restarted at 0x00401021, at the "call" instruction.

The steps shown in FIG. 3 are executed the first time that a particular exception is generated. After the instruction has been patched once, it remains patched for each subsequent execution. Thus, each software interrupt instruction and/or I/O instruction need only be patched once.

Figure 4:
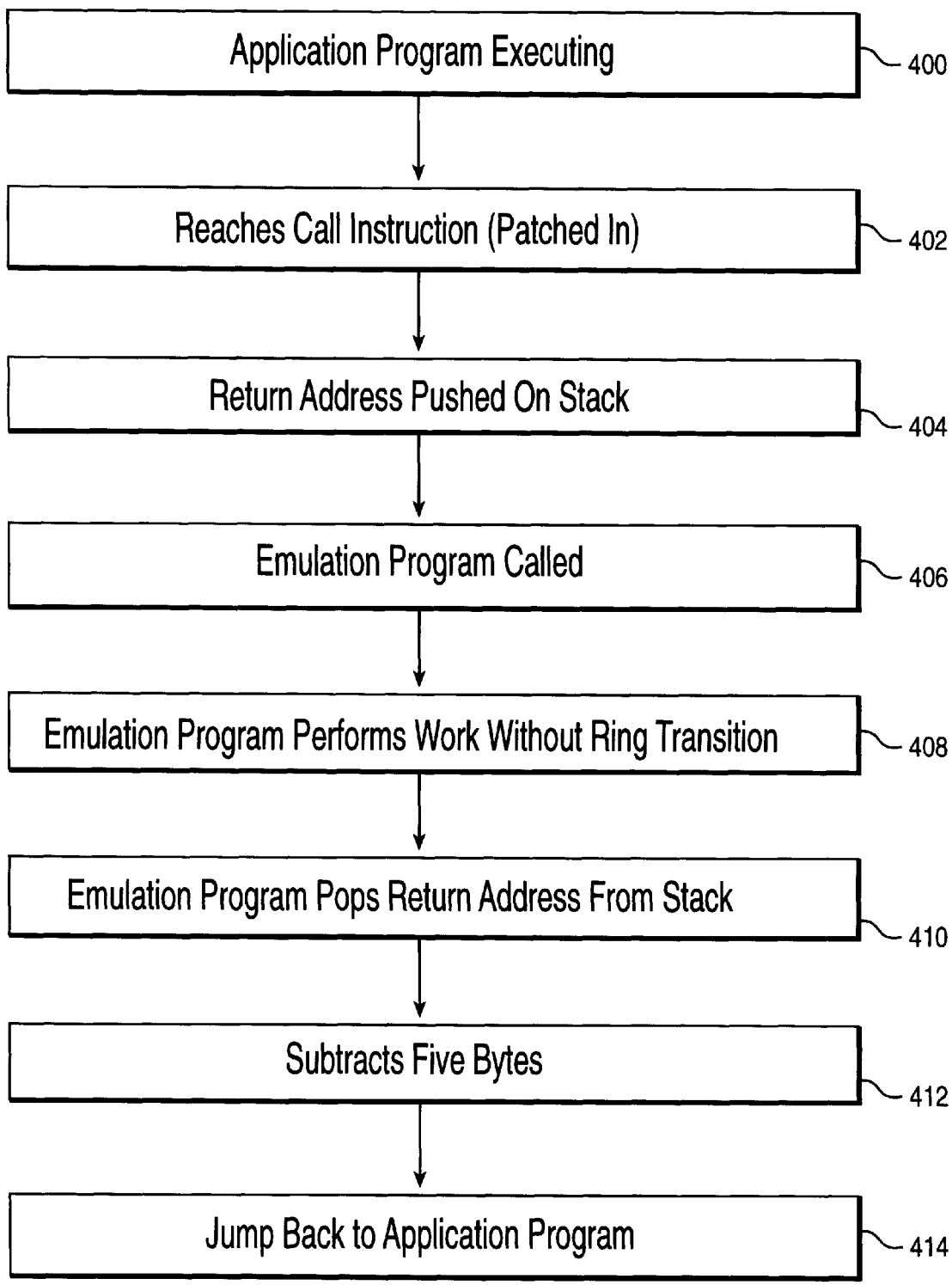
FIG. 4 is a flow chart depicting a method for executing an emulation program according to the teachings of the present invention.

Referring now to FIG. 4, a method for executing an emulation program will now be described. An application program, such as the program patched in FIG. 2B, is executing (step 400). The patched-in call instruction, such as the "call main(0x00401028) +20h" shown in FIG. 2B, is reached (step 402). The return address (i.e. 0x00401028) is pushed on the stack (step 404). The emulation program is then called (step 406) and performs the necessary work without doing a ring transition (step 408). The emulation program then pops the return address (i.e. 0x00401028) from the stack (step 410), and subtracts five bytes (step 412), resulting in 0x00401023. The application program then starts executing again at 0x00401023 (step 414).

Although the invention has been described with a certain degree of particularity, it should be recognized that elements thereof may be altered by persons skilled in the art without departing from the spirit and scope of the invention. One of the implementations of the invention is as sets of instructions resident in the random access memory of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art will appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for eliminating a ring transition in a protected mode program, comprising:

determining that a first instruction causes an exception;

replacing the first instruction by a call to an emulation program, wherein the emulation program executes in a same privilege ring as the protected mode program, and wherein the call to the emulation program does not cause an exception, and wherein during subsequent execution of the protected mode program, the call to the emulation program will be executed; and restarting the protected mode program at the call to the emulation program.

2. A method according to claim 1, wherein the first instruction is a software interrupt instruction.

3. A method according to claim 1, wherein the first instruction is an input/output instruction.

4. A method according to claim 1, wherein the replacing further comprises:

determining an offset, wherein the offset includes one or more existing bytes in the protected mode program; and determining a selector, wherein the selector and the offset are used in combination to reach the emulation program.

5. An information handling system, comprising:

a protected mode program, including one or more instructions;

means for determining that a first instruction in the protected mode program causes an exception when executed;

means for replacing the first instruction by a second instruction, wherein the second instruction is a call to an emulation program, and wherein the emulation program executes in a same privilege ring as the protected mode program, and wherein the call to the emulation program does not cause an exception, and wherein during subsequent execution of the protected mode program, the call to the emulation program will be executed; and means for restarting the protected mode program at the call to the emulation program.

6. An information handling system according to claim 5, wherein the first instruction is a software interrupt instruction.

7. An information handling system according to claim 5, wherein the first instruction is an input/output instruction.

8. An information handling system according to claim 5, wherein the means for replacing further comprises:

means for determining an offset, wherein the offset includes one or more existing bytes in the protected mode program; and means for determining a selector, wherein the selector and the offset are used in combination to reach the emulation program.

9. A computer readable medium for eliminating a ring transition in a protected mode program, comprising:

means for determining that a first instruction in the protected mode program causes an exception when executed;

means for replacing the first instruction by a second instruction, wherein the second instruction is a call to an emulation program, and wherein the emulation program executes in a same privilege ring as the protected mode program, and wherein the call to the emulation program does not cause an exception, and wherein during subsequent execution of the protected mode program, the call to the emulation program will be executed; and means for restarting the protected mode program at the call to the emulation program.

10. A computer readable medium according to claim 9, wherein the first instruction is a software interrupt instruction.

11. A computer readable medium according to claim 9, wherein the first instruction is an input/output instruction.

12. A computer readable medium according to claim 9, wherein the means for replacing further comprises:

means for determining an offset, wherein the offset includes one or more existing bytes in the protected mode program; and means for determining a selector, wherein the selector and the offset are used in combination to reach the emulation program.

* * * * *